(12) United States Patent
Pu et al.

(10) Patent No.: US 12,455,481 B2
(45) Date of Patent: Oct. 28, 2025

(54) DISPLAY DEVICE

(71) Applicant: HKC CORPORATION LIMITED, Shenzhen (CN)

(72) Inventors: Zhouchen Pu, Shenzhen (CN); Lidan Ye, Shenzhen (CN)

(73) Assignee: HKC CORPORATION LIMITED, Shenzhen (CN)

(*) Notice: Subject to any disclaimer, the term of this patent is extended or adjusted under 35 U.S.C. 154(b) by 10 days.

(21) Appl. No.: 18/669,023

(22) Filed: May 20, 2024

(65) Prior Publication Data

US 2025/0013108 A1    Jan. 9, 2025

(30) Foreign Application Priority Data

Jul. 5, 2023   (CN) .......................... 202310814058.9

(51) Int. Cl.
*G02F 1/1362*    (2006.01)
*G02F 1/1368*    (2006.01)

(52) U.S. Cl.
CPC ...... *G02F 1/136286* (2013.01); *G02F 1/1368* (2013.01)

(58) Field of Classification Search
CPC .......................... G02F 1/136286; G02F 1/1368
See application file for complete search history.

(56) References Cited

U.S. PATENT DOCUMENTS

| | | | |
|---|---|---|---|
| 2014/0147659 A1* | 5/2014 | Chun ................... | G02F 1/1339 428/327 |
| 2018/0154477 A1* | 6/2018 | Jung ....................... | H05B 6/14 |
| 2020/0073168 A1* | 3/2020 | Zhao ................. | G02F 1/136286 |

FOREIGN PATENT DOCUMENTS

| | | |
|---|---|---|
| CN | 103834323 | 6/2014 |
| CN | 108983476 | 12/2018 |
| CN | 109451601 | 3/2019 |
| CN | 116165823 | 5/2023 |
| GB | 2309573 | 7/1997 |
| JP | 2010181515 | 8/2010 |

OTHER PUBLICATIONS

CNIPA, First Office Action for CN Application No. 202310814058.9, Aug. 5, 2023.

* cited by examiner

*Primary Examiner* — Robert J Michaud
(74) *Attorney, Agent, or Firm* — Hodgson Russ LLP (57) ABSTRACT

A display device includes a liquid crystal display (LCD) panel, a plurality of magnetic nano particles are provided within the LCD panel, and the display device further includes an alternating current (AC) power supply assembly and a first electromagnet; and the first electromagnet is provided on at least a side of the LCD panel, and connected to the AC power supply assembly. The magnetic nano particles are located within an area covered by the alternating magnetic field and can generate heat under the alternating magnetic field, to improve a poor display in the low temperature.

16 Claims, 4 Drawing Sheets

DISPLAY DEVICE

CROSS-REFERENCE TO RELATED APPLICATIONS

The present disclosure claims priority to Chinese Patent Application No. 202310814058.9, filed Jul. 5, 2023, the entire application of which is incorporated herein by reference.

TECHNICAL FIELD

The present disclosure belongs to the technical field of displays, and specifically relates to a display device.

BACKGROUND

Liquid crystals are a state of matter between solid and liquid, and when heated to the clear point, they will become transparent liquid, and when the temperature is low to the freezing point, they will crystallise into a turbid solid state. Therefore, the liquid crystals are more sensitive to changes in ambient temperature. Displayer is sometimes used in extreme low temperature environments, and usually the freezing point of liquid crystals is at −20~−30° C., and when the temperature of liquid crystals exceed the freezing point, liquid crystals will condense to prevent them from working. Moreover, when liquid crystals work in a lower temperature, the problems such as slower response, poor residual image, lower contrast and uneven colour will appear.

SUMMARY

There is provided a display device according to embodiments of the present disclosure. The technical solution is as below:

According to a first aspect of embodiments of the present disclosure, the display device provided in the present disclosure may include a liquid crystal display (LCD) panel, a plurality of magnetic nano particles are provided within the LCD panel, and the display device further includes:

an alternating current (AC) power supply assembly; and
at least one electromagnet provided on at least a side of the LCD panel, wherein the at least one electromagnet includes a first electromagnet, the first electromagnet is connected to the AC power supply assembly and is capable of generating an alternating magnetic field under an alternating current provided by the AC power supply assembly;

wherein the magnetic nano particles are located within an area covered by the alternating magnetic field and are capable of generating heat under the alternating magnetic field.

Other features and advantages of the present disclosure will become apparent through the following detailed description, or will be learned in part through the practice of the present disclosure.

It should be understood that the above general description and the detailed description that follows are exemplary and explanatory only and do not limit the present disclosure.

BRIEF DESCRIPTION OF THE DRAWINGS

The accompanying drawings herein are incorporated into and form a part of the specification, illustrate embodiments consistent with the present disclosure, and are used in conjunction with the specification to explain the principles of the present disclosure. Obviously, the accompanying drawings in the following description are only some of the embodiments of the present disclosure, and other accompanying drawings can obtained from these drawings without creative labour for those skilled in the art.

DETAILED DESCRIPTION OF THE EMBODIMENTS

Embodiments will now be described more fully with reference to the accompanying drawings. However, the embodiments can be implemented in a variety of forms and should not be construed as a limitation of the embodiments set forth herein; rather, the provision of these embodiments allows for the present disclosure to be more comprehensive and complete and conveys the idea of the embodiments in a comprehensive manner to those skilled in the art.

In addition, the described features, structures, or characteristics can combined in one or more embodiments in any suitable manner. In the following description, many specific details are provided thereby giving a full understanding of the embodiments of the present disclosure. However, those skilled in the art will realize that it is possible to practice the technical solutions of the present disclosure without one or more of the specific details, or that other methods, components, devices, steps, etc. can employed. In other cases, the publicly known methods, devices, implementations, or operations are not shown or described in detail to avoid obscuring aspects of the present disclosure.

The present disclosure is described in further detail below in connection with the accompanying drawings and specific embodiments. It is to be noted herein that the technical features involved in the various embodiments of the present disclosure described below can combined with each other as long as they do not constitute a conflict with each other. The embodiments described below by reference to the accompanying drawings are exemplary and are intended to be used for explaining the present disclosure and are not to be construed as a limitation of the present disclosure.

Embodiment I

The embodiment of the present disclosure provides a display device, which includes a liquid crystal display (LCD) panel 10, an AC power supply assembly 11, and at least one electromagnet 12.

Figure 1:
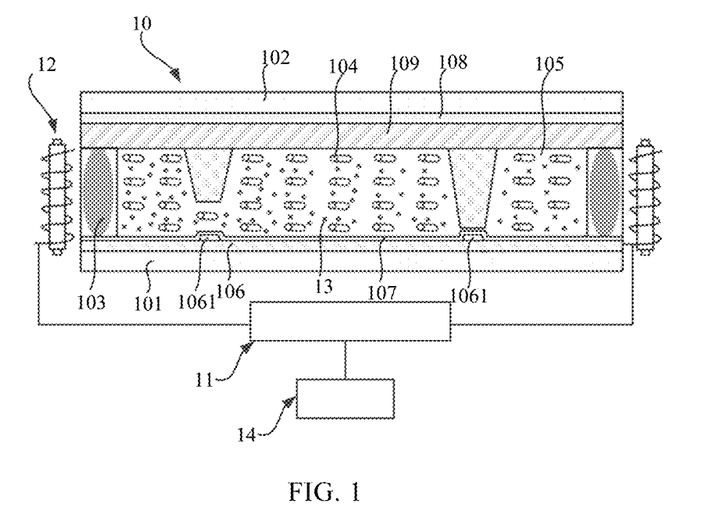
FIG. 1 is a schematic structural diagram of a display device according to embodiment I of the present disclosure.

As shown in FIG. 1, the LCD panel 10 may include a first substrate 101, a second substrate 102, a frame glue 103, and a liquid crystal molecule 104. The first substrate 101 is provided opposite to the second substrate 102 through the frame glue 103, and the first substrate 101, the second substrate 102, and the frame glue 103 may enclose to form an accommodation cavity 105.

For example, the first substrate 101 and the second substrate 102 may be glass substrates, but not limited thereto, but may also be polyimide (PI) substrates, etc., or a multilayer substrate structures formed by a plurality of layers of different materials (e.g., a glass layer+a PI layer). One of the surfaces of the first substrate 101 and the second substrate 102 facing each other can be provided with a thin film transistor (TFT) array layer 106 and a directional layer 107 in sequence. The TFT array layer 106 may include a plurality of TFT switches 1061, and a colour film layer 108 and a protective layer 109 may be provided on the other of the surfaces of the first substrate 101 and the second substrate 102 facing each other in sequence. The frame glue 103 may be a silicone-containing adhesive material structure.

The liquid crystal molecules 104 can filled in the accommodation cavity 105 enclosed by the frame glue 103, the first substrate 101, and the second substrate 102. The liquid crystal molecules 104 can be deflected under the control of the TFT array layer to match a backlight module for display.

The AC power supply assembly 11 is configured to provide an alternating current, the electromagnet 12 may be provided on at least one side of the LCD panel 10, at least a portion of the electromagnet 12 is connected to the AC power supply assembly 11, and the electromagnet 12 can generate an alternating magnetic field under the alternating current provided by the AC power supply assembly 11. A plurality of magnetic nano particles 13 may be provided within the LCD panel 10, the magnetic nano particles are located within an area covered by the alternating magnetic field generated by the electromagnet 12, and the magnetic nano particles 13 can generate heat under the alternating magnetic field.

When the display device is used in a low temperature environment, the AC power supply assembly 11 can supply the alternating current to the first electromagnet 12 to make the first electromagnet 12 to generate an alternating magnetic field, thereby making the magnetic nano particles 13 inside the liquid crystal display panel 10 to generate heat to increase the temperature inside the liquid crystal display panel 10, and then to ensure that the liquid crystal molecules 104 can be at the temperature at which they rotate normally, so as to ensure that the liquid crystal display panel 10 can normally display.

Figure 2:
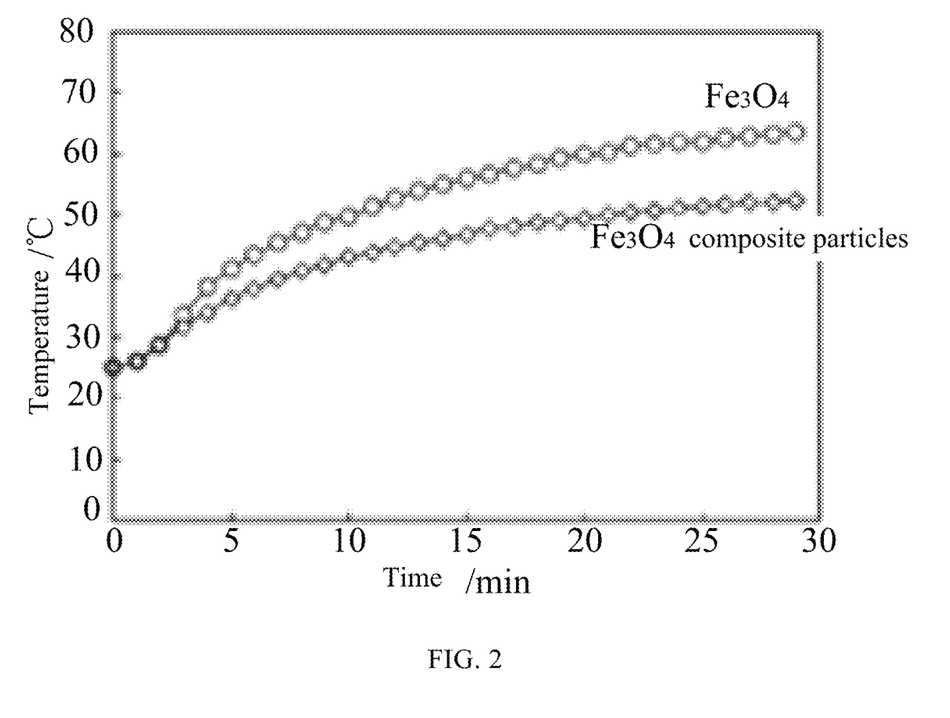
FIG. 2 is a schematic diagram of a heating curve of magnetic nano particles under an alternating magnetic field according to an embodiment I of the present disclosure.

For example, the magnetic nano particles 13 can be a metal nano particles such as iron (Fe), nickel (Ni) and cobalt (Co), or a metal oxide nano particles such as iron tetraoxide ($Fe_3O_4$), and a diameter of the magnetic nano particles 13 is about 10 nm. The magnetic nano particles 13 generate heat under the alternating magnetic field, and the temperature of the magnetic nano particles 13 will increase with the increase of action time of the alternating magnetic field, for example, the heating performance of magnetic nano particles $Fe_3O_4$ or magnetic nano $Fe_3O_4$ composite particles under the alternating magnetic field are shown in FIG. 2, with a horizontal coordinate of time in minutes and a vertical coordinate of temperature in degrees Celsius (° C.), so that since magnetic nano particles 13 are introduced into the LCD panel 10, the magnetic nano particles 13 generate heat in the LCD panel 10, to make the temperature of the magnetic nano particles 13 increase, thereby ensuring that the LCD panel 10 maintains a certain temperature, and then allowing the liquid crystal molecules 104 to work normally in the low temperature environment to ensure that the display device displays normally.

Exemplarily, the display device may include a controller 14, which is connected to the AC power supply assembly 11. When receiving a low temperature signal that the temperature of the LCD panel 10 is lower than a preset temperature, the controller 14 is configured to control the AC power supply assembly 11 to conduct with the electromagnet 12 to provide the alternating current to the electromagnet 12, such design can automatically control the on-off relationship between the AC power supply assembly 11 and the electromagnet 12 according to the temperature change, to ensure that the display device can automatically control the AC power supply assembly 11 to conduct with the electromagnet 12 in the low temperature environment, so that the display can display normally.

For example, the preset temperature can be the temperature of the freezing point of the liquid crystal, for example, −20° C. That is to say, when the temperature of the LCD panel 10 is lower than the temperature of the freezing point of the liquid crystal molecules 104, the low temperature signal can be generated directly and transmitted to the controller 14, and the controller 14 controls the AC power supply assembly 11 to conduct with and the electromagnet 12 according to the low temperature signal, to provide the electromagnet 12 with an alternating current, such that the electromagnet 12 generates the alternating magnetic field, and then the magnetic nano particles 13 can generate heat under the alternating magnetic field and transmit the heat to the liquid crystal molecules 104, so that the temperature of the liquid crystal molecules 104 is higher than the temperature of their freezing points, to ensure that the liquid crystal molecules 104 can be deflected normally.

The controller 14 may control the temperature inside the LCD panel 10 by controlling the action time of the alternating magnetic field of the electromagnet 12, to ensure that the liquid crystal molecules 104 work at an optimal temperature.

Further, the display device may also include a temperature sensor (not shown in the figures), which is connected to the controller 14 for detecting the temperature of the LCD panel 10 and transmitting the temperature to the controller 14. Since the temperature sensor can automatically detect the temperature of the LCD panel 10 in real time, and then the working state of the electromagnet 12 can be automatically controlled, so that the LCD panel 10 can work normally.

The temperature sensor may be provided within the LCD panel 10, for example, on a substrate with a TFT array layer 106, so that the temperature of the liquid crystal molecules 104 within the LCD panel 10 can be more directly detected, to improve the control accuracy. Furthermore, since the temperature sensor is provided at the TFT array layer 106, it is also convenient for the temperature sensor to be routed and to be connected to the controller 14, etc.

In one embodiment, as shown in FIG. 1, the magnetic nano particles 13 can be filled in the accommodation cavity 105 enclosed by the frame glue 103, the first substrate 101, and the second substrate 102, so that the magnetic nano particles 13 are closer to the liquid crystal molecules 104, so that the heat generated by the magnetic nano particles 13 can be quickly transferred to the liquid crystal molecules 104, and then the temperature of the liquid crystal molecules 104 inside the LCD panel 10 can be quickly increased to a temperature at which the liquid crystal molecules 104 can be deflected normally.

Optionally, as shown in FIG. 1, the plurality of magnetic nano particles 13 can be mixed with the liquid crystal molecules 104 to enable the liquid crystal molecules 104 within the LCD panel 10 to be rapidly and uniformly heated.

Further, the magnetic nano particles 13 of the present embodiment are movable within the accommodation cavity 105 enclosed by the frame glue 103, the first substrate 101, and the second substrate 102. Specifically, as shown in FIG. 3, the display device may include a DC power supply assembly 15, and the electromagnet 12 of the present embodiment may include a first electromagnet 12a and a second electromagnet 12b.

The first electromagnet 12a is connected to the AC power supply assembly 11, that is to say, the first electromagnet 12a is configured to generate the alternating magnetic field to heat the liquid crystal molecules 104 inside the LCD panel 10, so that the liquid crystal molecules 104 can be heated up to a temperature that satisfies the normal working even in the low temperature environment.

Specifically, the controller 14 is configured to control the AC power supply assembly 11 to conduct or stop conducting with the first electromagnet 12a at least according to the temperature information of the LCD panel 10. For example, when the temperature of the LCD panel 10 is lower than a preset temperature, the controller 14 may control the AC power supply assembly 11 to conduct with the first electromagnet 12a, so as to provide the first electromagnet 12a with the alternating current, thereby generating the alternating magnetic field to heat the magnetic nano particles 13 mixed in the liquid crystal molecules 104, and then heat the liquid crystal molecules 104 by means of heat transfer, so that the temperature of the liquid crystal molecules 104 is higher than the preset temperature, the liquid crystal molecules 104 can work normally. It should be understood that when the temperature of the LCD panel 10 is higher than the preset temperature, the controller 14 may also control the AC power supply assembly 11 to stop conducting with the first electromagnet 12a to solve a problem of power loss.

Figure 3:
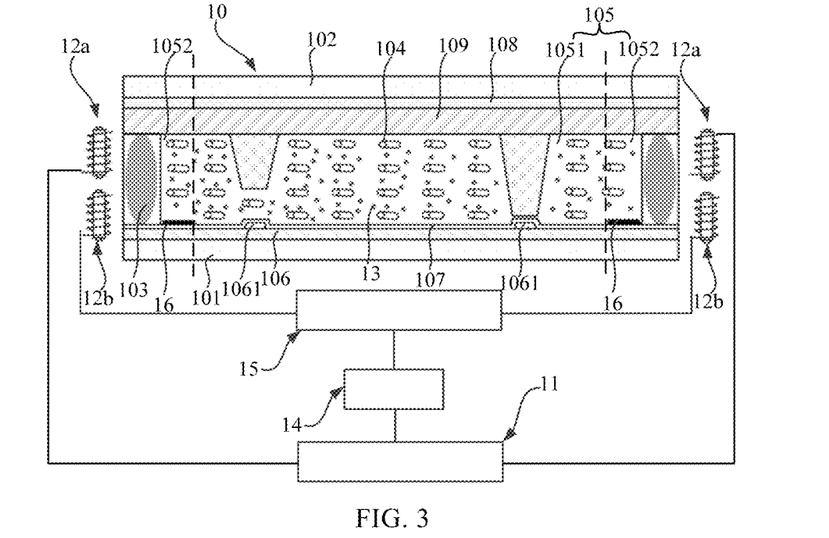
FIG. 3 is a schematic structural diagram of another display device in embodiment I of the present disclosure in which the magnetic nano particles are uniformly dispersed in the accommodation cavity.

As shown in FIG. 3, the second electromagnet 12b can be connected to the DC power supply assembly 15, and the second electromagnet 12b can generate a constant magnetic field under the direct current supplied by the DC power supply assembly 15, and the magnetic nano particles 13 can move to corresponding positions within the accommodation cavity 105 under the constant magnetic field.

Specifically, as shown in FIG. 3, the controller 14 can be connected to the DC power supply assembly 15, and the controller 14 is configured to control the DC power supply assembly 15 to conduct or stop conducting with the second electromagnet 12b at least according to the display information of the LCD panel 10, that is to say, the present embodiment may control, according to the display information of the LCD panel 10, the magnetic nano particles 13 to move to specific positions within the LCD panel 10, so as to ensure that the display device can work normally in the low temperature environment and meet the display requirements.

In one embodiment, as shown in FIG. 3, the accommodation cavity 105 enclosed by the frame glue 103, the first substrate 101, and the second substrate 102 may include a display area 1051 and an edge collection area 1052 located on a side of the display area 1051 near the frame glue 103, and the controller 14 is configured to control the DC power supply assembly 15 to conduct with the second electromagnet 12b when the display information is a display starting command, and then make the DC power supply assembly 15 to provide a first direct current to the second electromagnet 12b. The second electromagnet 12b generates a first constant magnetic field under the first direct current, and the magnetic nano particles 13 move from the display area 1051 to the edge collection area 1052 under the first constant magnetic field, so as to avoid the magnetic nano particles 13 from affecting the normal display.

As shown in FIG. 3, the edge collection area 1052 can be provided with a permanent magnet 16, the permanent magnet 16 is provided on a side of the first substrate 101 towards the second substrate 102 and/or on a side of the second substrate 102 towards the first substrate 101. After the magnetic nano particles 13 move from the display area 1051 to the edge collection area 1052 under the first constant magnetic field, the magnetic nano particles 13 can be sucked to the permanent magnet 16 under the magnetism of the permanent magnet 16. The present embodiment collects the magnetic nano particles 13 through the permanent magnet 16, which may avoid the situation in which the magnetic nano particles 13 move to the display area 1051 during the display process to affect the normal display.

Figure 4:
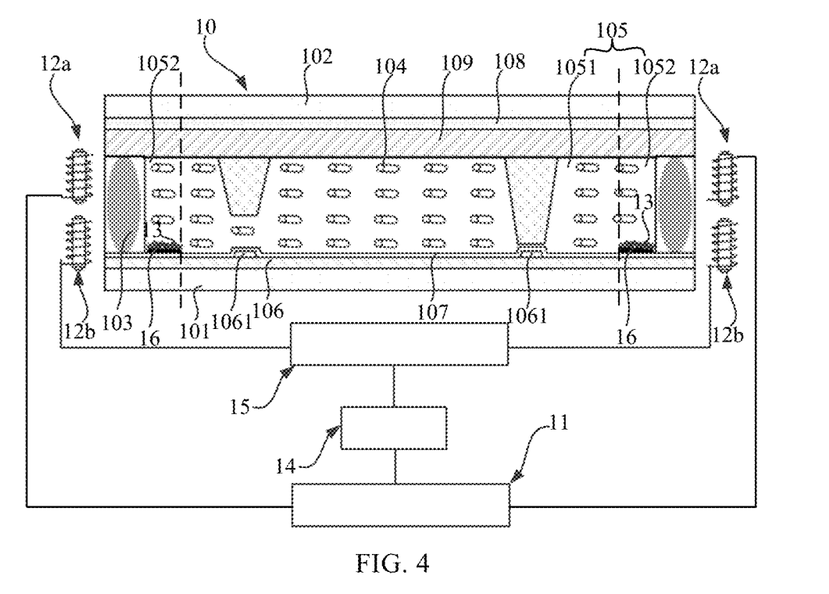
FIG. 4 is a schematic structural diagram of another display device in embodiment I of the present disclosure in which the magnetic nano particles are sucked on a permanent magnet.
Figure 5:
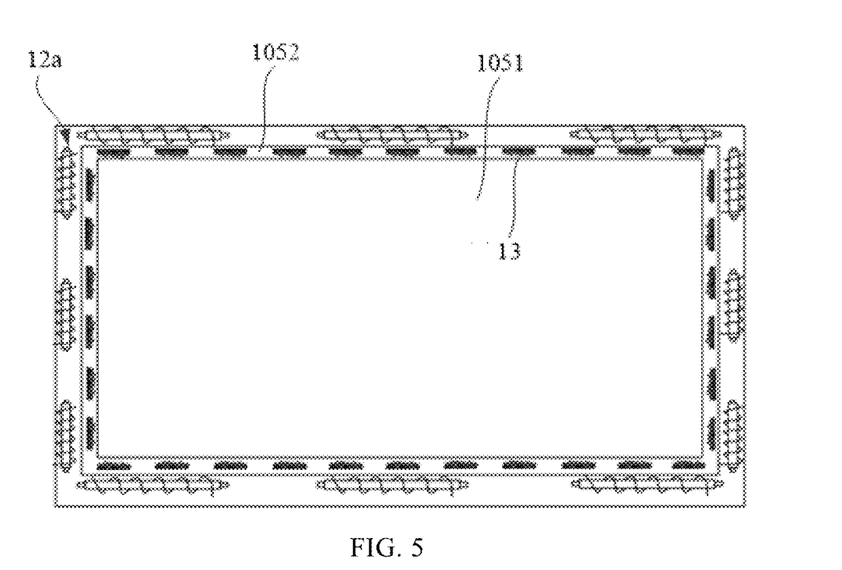
FIG. 5 is a top view of the display device shown in FIG. 4.

Specifically, in the low temperature environment (lower than the temperature at which the liquid crystal molecules 104 work normally), if the controller 14 receives a display starting command, the controller 14 may first control the AC power supply assembly 11 to conduct with the first electromagnet 12a, and then make the AC power supply assembly 11 to provide a first alternating current to the first electromagnet 12a, so as to make the first electromagnet 12a to generate a first alternating magnetic field to heat the magnetic nano particles 13 mixed in the liquid crystal molecules 104, thereby completing the heating of the liquid crystal molecules 104, so that the temperature of the liquid crystal molecules 104 is higher than the preset temperature, i.e., up to a temperature at which the liquid crystal molecules 104 can work normally. After, the controller 14 controls the AC power supply assembly 11 to stop conducting with the first electromagnet 12a, and controls the DC power supply assembly 15 to conduct with the second electromagnet 12b, and makes the DC power supply assembly 15 to provide a first direct current to the second electromagnet 12b, so as to make the second electromagnet 12b to generate a first constant magnetic field. The magnetic nano particles 13 move from the display area 1051 to the edge collection area 1052 under the first constant magnetic field, and can be sucked to the permanent magnet 16 under the magnetism of the permanent magnet 16, as shown in FIGS. 4 and 5. After the magnetic nano particles 13 move to the edge collection area 1052, the LCD panel 10 can be controlled to start displaying.

Since the magnetic nano particles 13 move from the display area 1051 to the edge collection area 1052 under the first constant magnetic field, and can be sucked to the permanent magnet 16 under the magnetism of the permanent magnet 16, thus, in order to save energy, during the normal display, the controller 14 may also control the DC power supply assembly 15 to stop conducting with the second electromagnet after the magnetic nano particles 13 move to the edge collection area 1052. Furthermore, in the normal display process, if it is detected that the temperature inside the LCD panel 10 is lower than the preset temperature, the controller 14 may continue to control the AC power supply assembly 11 to conduct with the first electromagnet 12a, to make the AC power supply assembly 11 to provide the first electromagnet 12a with a second direct current, so as to make the first electromagnet 12a to generate a second alternating magnetic field to act on the magnetic nano particles 13 sucked on the permanent magnet 16, so that the magnetic nano particles 13 continue to generate heat to increase the temperature inside the LCD panel 10, in such way, the temperature inside the LCD panel 10 is maintained.

Optionally, the second alternating current can be smaller than the first alternating current, so that a coverage of the second alternating magnetic field is smaller than a coverage of the first alternating magnetic field, and a coverage of the second alternating magnetic field may only cover the edge collection area 1052, so as to ensure that the magnetic nano particles 13 sucked on the permanent magnet 16 can continue to generate heat under the second alternating magnetic field to increase the temperature inside the LCD panel 10, and to avoid the second alternating magnetic field from affecting the LCD panel 10, to improve the display effect. Since the first alternating magnetic field is generated before the normal display of the LCD panel 10, the coverage of the first alternating magnetic field can cover the display area 1051 in addition to covering the edge collection area 1052, to ensure that the magnetic nano particles 13 dispersed inside the containment cavity 105 are distributed in the first alternating magnetic field, thereby making the liquid crystal molecules 104 within the accommodation cavity 105 to be rapidly and uniformly heated.

The controller 14 may also be configured to control the DC power supply assembly 15 to conduct with the second electromagnet 12b when the display information is a display closing command, and make the DC power supply assembly 15 to provide a second direct current to the second electromagnet 12b. The second electromagnet 12b generates a second constant magnetic field under the second direct current, and the magnetic nano particles 13 overcome the suction force of the permanent magnet 16 under the second constant magnetic field, and diffuse from the edge collection area 1052 to the display area 1051, recovering to the state shown in FIG. 3, such that the magnetic nano particles 13 can be fully mixed with the liquid crystal molecules 104 in a non-displayed state, so as to facilitate the liquid crystal molecules 104 to be sufficiently and rapidly heated in the low temperature environment, for being subsequently displayed.

It should be understood that the first electromagnet 12a in this embodiment can be defined as the electromagnet 12 which is connected to the AC power supply assembly 11 but not connected to the DC power supply assembly 15, and the second electromagnet 12b can be defined as the electromagnet 12 which is connected to the DC power supply assembly 15 but not connected to the AC power supply assembly 11, which is not limited herein. All of the electromagnets 12 mentioned in this embodiment (including the first electromagnet 12a, the second electromagnet 12b) may also be simultaneously connected to the AC power supply assembly 11 and the DC power supply assembly 15, and then the AC power supply assembly 11 and the DC power supply assembly 15 are separately controlled to energize the electromagnet 12 by the controller 14 in accordance with the actual situation. It should be noted that the AC power supply assembly 11 and the DC power supply assembly 15 may not energize the electromagnet 12 simultaneously, in other words, when the AC power supply assembly 11 is controlled to energize the electromagnet 12, the DC power supply assembly 15 needs to be disconnected from the electromagnet 12, and the electromagnet 12 at this time can be understood as a first electromagnet 12a, and when the DC power supply assembly 15 to is controlled to energize the electromagnet 12, the AC power supply assembly 11 needs to be disconnected from the electromagnet 12, and the electromagnet 12 at this time can be understood as a second electromagnet 12b.

In this embodiment, as shown in FIGS. 3 to 5, the electromagnet 12 can be provided on an outer periphery of the frame glue 103, specifically, the electromagnet 12 can be provided on a side of the frame glue 103 away from the liquid crystal molecules 104. A plurality of the electromagnet 12 are spaced apart around the frame glue 103 in a circle, so as to rapidly and uniformly heat the magnetic nano particles 13, thereby rapidly and uniformly heating the liquid crystal molecules 104, to ensure that the liquid crystal molecules 104 can be heated to a temperature at which they can work normally in the low temperature environment.

It is to be noted that when the electromagnet 12 includes a first electromagnet 12a and a second electromagnet 12b, as shown in FIGS. 3 and 4, the first electromagnet 12a and the second electromagnet 12b may be provided in the thickness direction, a plurality of the first electromagnets 12a are provided around the frame glue 103 in a circle, and a plurality of the second electromagnets 12b are provided around the frame glue 103 in a circle, which is not limited herein. However, the first electromagnet 12a and the second electromagnet 12b can be provided alternatively and around the frame glue 103 in a circle.

It should be noted that a plurality of the permanent magnets can be spaced apart around the frame glue 103 in a circle, as shown in FIGS. 3 to 5.

Embodiment II

Figure 6:
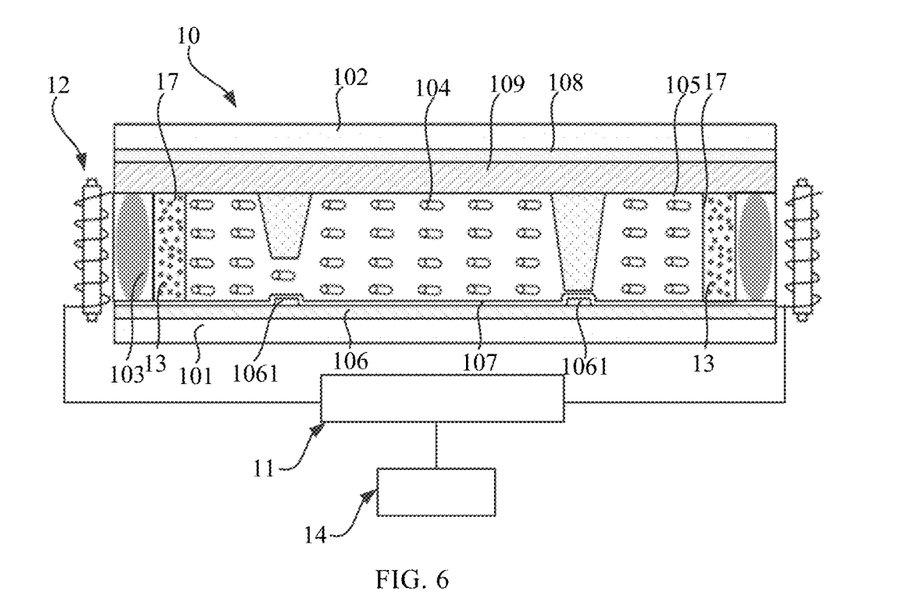
FIG. 6 is a schematic structural diagram of a display device in embodiment II of the present disclosure.

This embodiment II differs from embodiment I in that the magnetic nano particles 13 are positioned differently and the magnetic nano particles 13 are immovable, as follows:

In the embodiment II, as shown in FIG. 6, a side of the frame glue 103 near the liquid crystal molecules 104 is provided with a fixing portion 17, and the plurality of magnetic nano particles 13 are fixedly distributed within the fixing portion 17, in such way as to reduce the difficulty of design and cost.

For example, when the frame glue 103 is applied, an inner side of the frame glue 103 containing silicon spheres is coated with an adhesive material mixed with the magnetic nano particles 13 to form the fixing portion 17. In the low temperature environment, the electromagnet 12 is allowed to generate the alternating magnetic field, which acts on the magnetic nano particles 13 in the fixing portion 17 in the inner side of the frame glue 103, and the magnetic nano particles 13 generate heat, and the heat generated in the fixing portion 17 in the inner side is transferred to the inside of the LCD panel 10 by the means of heat transfer, so that a certain temperature is maintained inside the LCD panel 10. Similarly, for subsequent insulation inside the LCD panel 10, the temperature inside the LCD panel 10 can be detected by the temperature sensor provided inside the LCD panel 10, and can be maintained with the heat generated by the alternating magnetic field acting on the magnetic nano particles 13.

Figure 7:
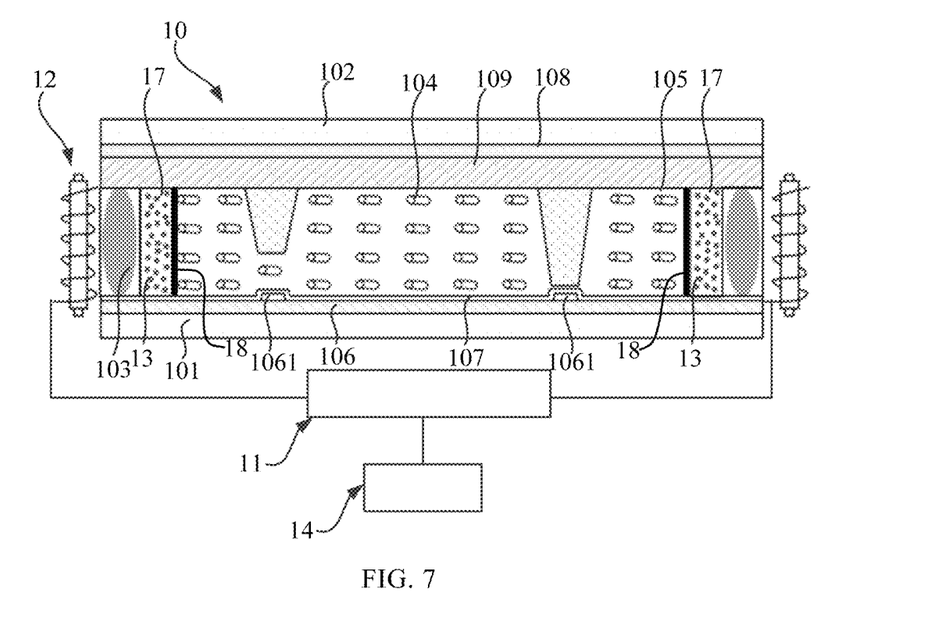
FIG. 7 is a schematic structural diagram of another display device in Embodiment II of the present disclosure.

Exemplarily, as shown in FIG. 7, the side of the fixing portion 17 away from the frame glue 103 can be provided with a thermally conductive magnetic field shielding layer 18, and the thermally conductive magnetic field shielding layer 18 has a thermal conductivity and magnetic field shielding effect. The thermal conductivity of the thermally conductive magnetic field shielding layer 18 can make the heat generated by the magnetic nano particles 13 within the fixing portion 17 to be rapidly transferred to the liquid crystal molecules 104, so as to enable the temperature of the liquid crystal molecules 104 to be quickly heated up to a temperature at which the liquid crystal molecules 104 can work normally. In addition, the magnetic field shielding effect of the thermally conductive magnetic field shielding layer 18 prevents the alternating magnetic field generated by the electromagnet 12 from acting on the liquid crystal molecules 104 and leading to a poor display, so that not only the display device can work in the low temperature environment, but also the display effect can be ensured.

It should be noted that the embodiment II is different from embodiment I except for the above content, and the rest of the structure can be referred to the content described in embodiment I and will not be repeated herein.

In addition, the terms "first", "second", and "third" are used for descriptive purposes only, and are not to be understood as indicating or implying relative importance or implicitly specifying the number of technical features indicated. Thus, a feature defined with "first", "second", "third" may expressly or implicitly include one or more such features. In the description of the present disclosure, "more than one" means two or more, unless otherwise expressly and specifically limited.

It should be noted that "up", "down", "left", "right", etc. are only used as distinctions to facilitate description, which does not limit the embodiments of the present disclosure in terms of orientation, for example, the "up" may be "down", "left", "right" and other orientations in practice. In the present disclosure, unless otherwise expressly provided and limited, the terms "assembly", "connection", etc. shall be broadly construed, e.g., it can be a fixed connection, a detachable connection, or an integration connection; it can be a mechanical connection, or an electrical connection; it can be a direct connection or an indirect connection through an intermediate medium, a connection within two elements or an interaction between two elements. For those skilled in the art, the specific meanings of the above terms in the present disclosure can understood based on actual situation.

In this specification, the terms "some embodiments", "exemplarily", etc. means that the specific features, structures, materials, or characteristics described in conjunction with the embodiment or example are included in at least one embodiment or example of the present disclosure. In this specification, schematic expressions of the above terms do not necessarily refer to the same embodiment or example. Moreover, the specific features, structures, materials, or characteristics described can be combined in any one or more embodiments or examples in a suitable manner. Furthermore, without contradicting each other, those skilled in the art may combine different embodiments or examples and features of different embodiments or examples described in this specification.

Although embodiments of the present disclosure are shown and described above, it is understood that the above embodiments are exemplary and are not to be construed as a limitation of the present disclosure, and that those skilled in the art may make changes, modifications, substitutions, and variations of the above embodiments within the scope of the present disclosure, and therefore, any changes or modifications made in accordance with the claims and the specification of the present disclosure shall fall within the scope of the present disclosure.

What is claimed is:

1. A display device, comprising a liquid crystal display (LCD) panel, wherein a plurality of magnetic nano particles are provided within the LCD panel, and the display device further comprises:
    an alternating current (AC) power supply assembly; and
    at least one electromagnet provided on at least a side of the LCD panel, wherein the at least one electromagnet comprises a first electromagnet, wherein the first electromagnet is connected to the AC power supply assembly and is capable of generating an alternating magnetic field under an alternating current provided by the AC power supply assembly;
    wherein the plurality of magnetic nano particles are located within an area covered by the alternating magnetic field and are capable of generating heat under the alternating magnetic field.

2. The display device according to claim 1, further comprising a controller connected to the AC power supply assembly, wherein the controller is configured to control the AC power supply assembly to conduct with the first electromagnet to provide the alternating current to the first electromagnet when receiving a low temperature signal that a temperature of the LCD panel is lower than a preset temperature.

3. The display device according to claim 2, further comprising a temperature sensor, wherein the temperature sensor is connected to the controller and configured to detect and transmit the temperature of the LCD panel to the controller.

4. The display device according to claim 3, wherein the LCD panel comprises a first substrate, a second substrate, a frame glue and liquid crystal molecules;
    wherein the first substrate is provided opposite to the second substrate through the frame glue, and the liquid crystal molecules are filled in an accommodation cavity enclosed by the frame glue, the first substrate and the second substrate; and
    wherein the plurality of magnetic nano particles are filled within the accommodation cavity enclosed by the frame glue, the first substrate and the second substrate.

5. The display device according to claim 4, wherein:
    the plurality of magnetic nano particles are mixed with the liquid crystal molecules; or
    the frame glue is provided with a fixing portion on a side near the liquid crystal molecules, and the plurality of magnetic nano particles are fixedly distributed within the fixing portion.

6. The display device according to claim 4, wherein:
    the plurality of magnetic nano particles are mixed with the liquid crystal molecules and are movably provided within the accommodation cavity;
    the display device further comprises a controller and a direct current (DC) power supply assembly, wherein the at least one electromagnet further comprises a second electromagnet connected to the DC power supply assembly, wherein a constant magnetic field is generable by the second electromagnet under a direct current provided by the DC power supply assembly, and the plurality of magnetic nano particles are movable to corresponding positions within the accommodation cavity under the constant magnetic field; and
    the controller is connected to the DC power supply assembly and the AC power supply assembly, and configured to control the AC power supply assembly to conduct or stop conducting with the first electromagnet at least according to temperature information of the LCD panel, and further configured to control the DC power supply assembly to conduct or stop conducting with the second electromagnet at least according to display information of the LCD panel.

7. The display device according to claim 6, wherein the accommodation cavity comprises a display area and an edge collection area located on a side of the display area near the frame glue;
    wherein the controller is configured to control the DC power supply assembly to conduct with the second electromagnet when the display information is a display starting command, and make the DC power supply assembly supply a first direct current to the second electromagnet;

wherein the second electromagnet generates a first constant magnetic field under the first direct current, and the plurality of magnetic nano particles move from the display area to the edge collection area under the first constant magnetic field.

8. The display device according to claim 7, wherein the edge collection area is provided with a permanent magnet, wherein the permanent magnet is provided on a side of the first substrate near the second substrate and/or on a side of the second substrate near the first substrate;

wherein the plurality of magnetic nano particles are sucked to the permanent magnet under magnetism of the permanent magnet after the plurality of magnetic nano particles move from the display area to the edge collection area under the first constant magnetic field;

wherein the controller is configured to control the DC power supply assembly to conduct with the second electromagnet when the display information is a display closing command, make the DC power supply assembly supply a second direct current to the second electromagnet; and wherein the second electromagnet generates a second constant magnetic field under the second direct current, and the plurality of magnetic nano particles overcome a suction force of the permanent magnet under the second constant magnetic field and diffuse from the edge collection area to the display area.

9. The display device according to claim 4, wherein the frame glue is provided with a fixing portion on a side near the liquid crystal molecules, wherein the plurality of magnetic nano particles are fixedly distributed in the fixing portion, and the fixing portion is provided with a thermally conductive magnetic field shielding layer on a side away from the frame glue.

10. The display device according to claim 4, wherein the at least one electromagnet is provided on a side of the frame glue away from the liquid crystal molecules, and a plurality of electromagnets are spaced apart around the frame glue in a circle.

11. The display device according to claim 4, wherein one of surfaces of the first substrate and the second substrate facing each other is provided with a thin film transistor (TFT) array layer and a directional layer in sequence, and the TFT array layer comprises a plurality of TFT switches, and a colour film layer and a protective layer are provided on the other of surfaces of the first substrate and the second substrate facing each other in sequence.

12. The display device according to claim 4, wherein the preset temperature is a temperature of a freezing point of a liquid crystal, when the temperature of the LCD panel is lower than the temperature of the freezing point of the liquid crystal molecules, the low temperature signal is generated and transmitted to the controller.

13. The display device according to claim 6, wherein the temperature sensor is provided on a substrate with a TFT array layer.

14. The display device according to claim 8, wherein during normal display, the controller is configured to control the DC power supply assembly to stop conducting with the second electromagnet after the plurality of magnetic nano particles move to the edge collection area;

during the normal display, it is detected that the temperature inside the LCD panel is lower than the preset temperature, the controller is configured to continue to control the AC power supply assembly to conduct with the first electromagnet, to make the AC power supply assembly to provide the first electromagnet with the second direct current, to make the first electromagnet to generate a second alternating magnetic field to act on the plurality of magnetic nano particles sucked on the permanent magnet.

15. The display device according to claim 8, wherein a second alternating current is smaller than a first alternating current, and a coverage of a second alternating magnetic field is smaller than a coverage of a first alternating magnetic field, and a coverage of the second alternating magnetic field only covers the edge collection area.

16. The display device according to claim 6, wherein the first electromagnet and the second electromagnet are provided in a thickness direction, a plurality of first electromagnets are provided around the frame glue in a circle, and a plurality of second electromagnets are provided around the frame glue in a circle, or the first electromagnet and the second electromagnet are provided alternatively and around the frame glue in a circle.

* * * * *